US006866602B2

(12) United States Patent
Iverson

(10) Patent No.: US 6,866,602 B2
(45) Date of Patent: Mar. 15, 2005

(54) BELT DRIVE SYSTEM

(75) Inventor: Chris A. Iverson, Dayton, MN (US)

(73) Assignee: Performance Engineering & Machine Inc., Wadena, MN (US)

( * ) Notice: Subject to any disclaimer, the term of this patent is extended or adjusted under 35 U.S.C. 154(b) by 208 days.

(21) Appl. No.: 10/186,776

(22) Filed: Jul. 1, 2002

(65) Prior Publication Data
US 2004/0002401 A1 Jan. 1, 2004

(51) Int. Cl.[7] ................................................. F16H 7/12
(52) U.S. Cl. ...................................... 474/134; 474/150
(58) Field of Search ........................ 474/87, 101, 144, 474/199, 148, 150

(56) References Cited

U.S. PATENT DOCUMENTS

| 2,010,056 A | * | 8/1935 | Brush ......................... 474/87 |
| 2,613,544 A | * | 10/1952 | Cullman ..................... 474/150 |
| 4,069,882 A | * | 1/1978 | Leonard et al. ................ 474/8 |
| 5,836,843 A | * | 11/1998 | Richards ..................... 474/150 |

* cited by examiner

Primary Examiner—Thomas R. Hannon
(74) Attorney, Agent, or Firm—Kinney & Lange, P.A.

(57) ABSTRACT

The present invention is an efficient and durable drive system support that is easy to install and includes a flex plate engagable to a first end and a second end of a drive system, which carries strain applied to the drive system from tension in a drive belt.

17 Claims, 5 Drawing Sheets

BELT DRIVE SYSTEM

BACKGROUND OF THE INVENTION

The present invention relates to drive systems for motor vehicles. In particular, the present invention relates to belt drive systems that eliminate or substantially reduce the flexing of jackshafts and driveshafts occurring in drive systems.

Chain and belt drive systems for motor vehicles such as snowmobiles are essential components for transferring power from an engine to the points of application, such as snowmobile tracks. Power from an engine is first transferred to a jackshaft, causing the jackshaft to rotate. The jackshaft is attached to a drive system that transfers the rotational energy to a driveshaft. The driveshaft then transfers that power to the track to propel the snowmobile. A common problem with the previous chain and belt drive systems, however, is flexing of the jackshaft and driveshaft. The chains or belts are tightly looped around pulleys of the drive system, which are correspondingly attached to the jackshaft and driveshaft. Such tight looping causes tension between the pulleys, causing the jackshaft and driveshaft to flex under the stress. This results in damage to the jackshaft and driveshaft, and misalignment of the chain or belt—all of which reduce performance of the drive system.

In addition, chain drive systems experience additional complications associated from the use of a chain. First, chains require lubrication, such as oil, to ensure adequate performance. Lubricating fluids generate hydroscopic drag, reducing performance of the drive system. Chain drive systems also suffer from impediments attributed to chain-to-sprocket connections. The metal-to-metal interaction of a chain to a sprocket causes friction, which also reduces performance of the drive system. Finally, chains also can be extremely destructive upon cracking and shattering. If a chain shatters, it can seriously damage the chain case and the engine, both of which can be very expensive to repair.

BRIEF SUMMARY OF THE INVENTION

The present invention is an efficient and durable drive system support that is easy to install and includes a flex plate, which carries strain applied to the drive system from tension in a drive belt. The flex plate prevents the strain from flexing a vehicle jackshaft or driveshaft.

DETAILED DESCRIPTION

Figure 1:
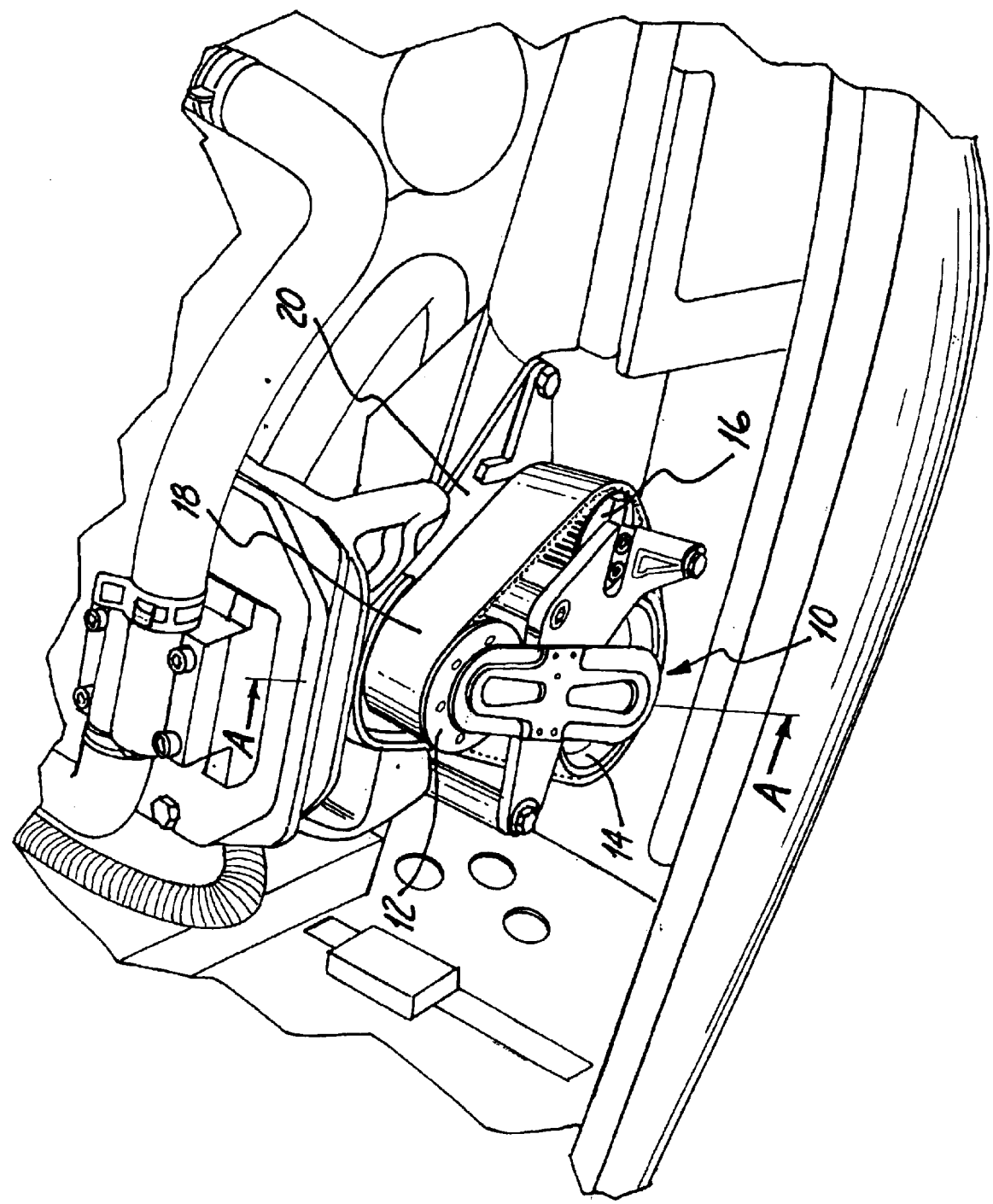
FIG. 1 is a perspective view of the present invention in use.

FIG. 1 is an illustration of the present invention in use with a snowmobile and includes flex plate 10, upper hub assembly 12, lower hub assembly 14, tensioning roller 16, belt 18, and engine chain case 20. The present invention mounts directly to engine chain case 20 and is a direct replacement for a factory drive system.

Flex plate 10 engages and supports upper hub assembly 12 and lower hub assembly 14, while allowing upper hub assembly 12 and lower hub assembly 14 to rotate freely with respect to flex plate 10. The support provided by flex plate 10 prevents upper hub assembly 12 and lower hub assembly 14 from pulling towards each other under strain from belt 18.

Tensioning roller 16 is attached to flex plate 10 as shown in FIG. 1 for retaining tension in belt 18. Belt 18 is a drive belt, such as a polychain GT2 8-mm belt with a 50-mm width. Belt 18 loops around and engages upper hub assembly 12, lower hub assembly 14, and tensioning roller 16.

The present invention shown in FIG. 1 provides an efficient and durable drive system for transferring power from an engine to the points of application, such as snowmobile tracks (not shown). Power from the engine rotates jackshaft 42 (shown in FIG. 2). When jackshaft 42 rotates, it forces upper hub assembly 12 to rotate, correspondingly inducing belt 18 to rotate. Belt 18 forces lower hub assembly 14 to rotate, which in turn rotates driveshaft 44 (shown in FIG. 2). Drive shaft 44 then rotates the snowmobile tracks for propulsion.

For a drive system, such as the present invention, to operate efficiently, belt 18 must be under tension so that it properly engages upper hub assembly 12 and lower hub assembly 14. Such tension, however, strains upper hub assembly 12 and lower hub assembly 14, resulting in shaft flexing and performance reduction. The use of flex plate 10, however, prevents such shaft flexing by supporting upper hub assembly 12 and lower hub assembly 14. Consequentially, flex plate 10 eliminates performance reduction in the drive system resulting from the tension of belt 18.

In addition, by using belt 18 instead of a chain, the present invention does not have problems associated with chain drive systems. Unlike a chain, belt 18 does not require oiling, eliminating the need to frequently check lubrication before use. Not requiring oil or other lubricating fluids also removes hydroscopic drag, which is associated with lubricating fluids and generates unwanted friction. Belt 18 also precludes unwanted frictional drag associated with chain-to-sprocket connections in chain drive systems and frees up rotating mass as well.

In addition, if a chain in a chain drive system cracks and shatters, it can seriously damage the chain case and the engine, both of which can be very expensive to repair. If belt 18 breaks, however, it will not damage chain case 20 or the engine. Therefore, the present invention has significant both economic and performance advantages over chain drive systems.

Figure 2:
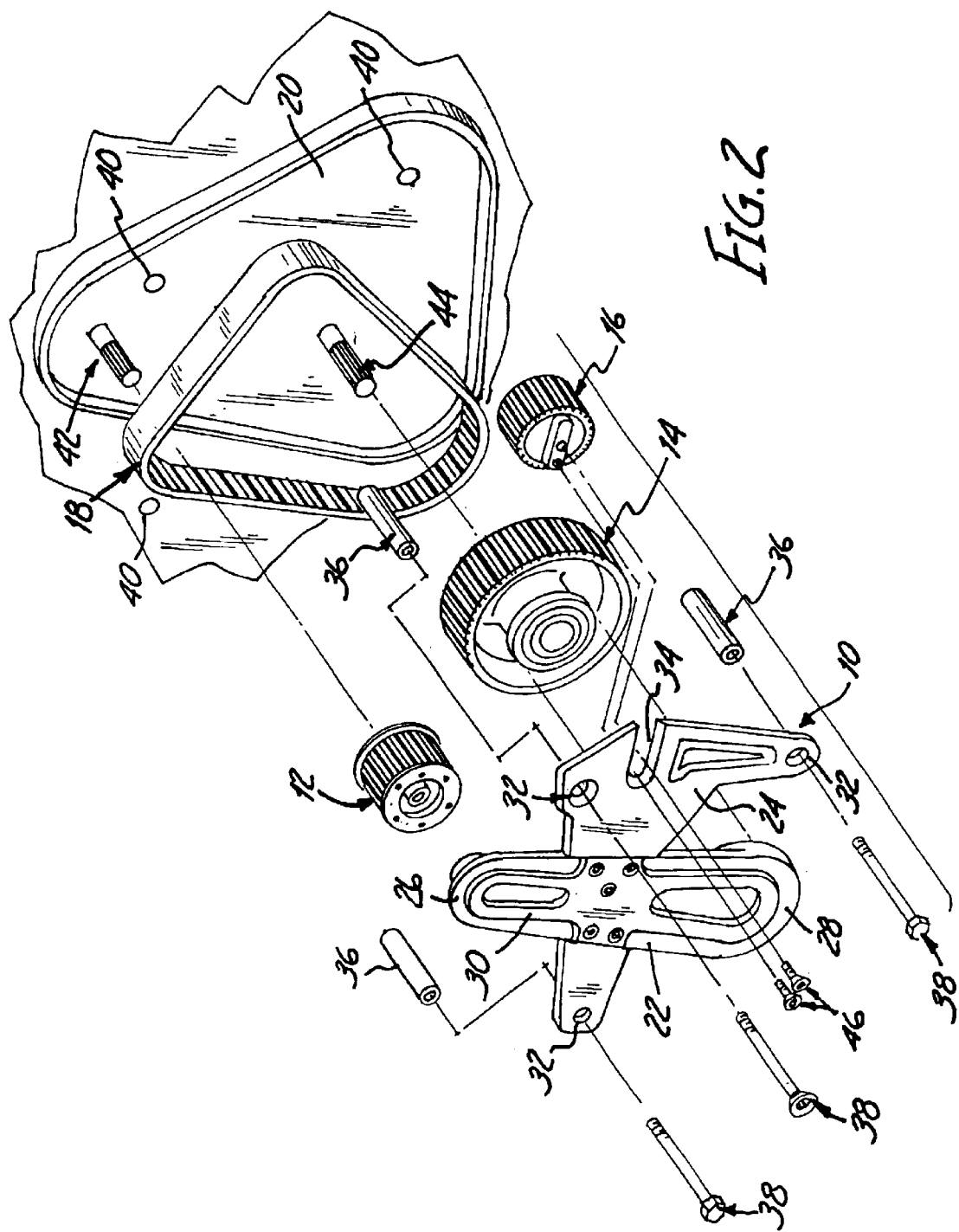
FIG. 2 is an exploded view of the present invention.

FIG. 2 is an exploded view of the present invention and includes flex plate 10, upper hub assembly 12, lower hub assembly 14, tensioning roller 16, belt 18, engine chain case 20, standoffs 36, bolts 38, jackshaft 42, driveshaft 44, and mounting screws 46. Flex plate 10 includes girdle 22 and cross plate 24. Girdle 22 includes first end 26, second end 28, and ribs 30. Cross plate 24 includes holes 32 and slot 34. Engine chain case 20 includes factory-made holes 40.

Flex plate 10 is formed by attaching girdle 22 and cross plate 24 at their mid-sections as shown in FIG. 2. Flex plate 10 may also be cast from a single piece, while still retaining first end 26, second end 28, ribs 30, holes 32 and slot 34. Manufacturing girdle 22 and cross plate 24 separately, however, generally allows for more compact packaging.

Flex plate 10 is directly mounted to engine chain case 20 by standoffs 36. Bolts 38 are inserted through holes 32, through standoffs 36, and into factory-made holes 40 of engine chain case 20, providing a secure mounting of flex plate 10 to engine chain case 20. Standoffs 36 allow flex plate 10 to be set off from engine chain case 20, while still providing a secure mounting.

An advantage of the present invention is that holes 32 match up with factory-made holes 40 in engine chain case 20. Factory-made holes 40 are standardized holes that engine manufacturers provide for factory-installed drive systems. The locations of holes 32 allow flex plate 10 to be directly mounted to many different brands and models of snowmobiles without requiring extra redesign or redrilling of engine chain case 20, and without requiring extra adapter components. This advantage reduces the time and labor required to install the present invention.

Upper hub assembly 12 directly inserts onto jackshaft 42. Upper hub assembly 12 and jackshaft 42 are splined to transfer rotational energy from jackshaft 42 to upper hub assembly 12. First end 26 of girdle 22 also engages and supports upper hub assembly 12, allowing upper hub assembly 12 to rotate freely with respect to girdle 22. Lower hub assembly 14 directly inserts onto driveshaft 44. Lower hub assembly 14 and driveshaft 44 are splined to transfer rotational energy from lower hub assembly 14 to driveshaft 44. Second end 28 of girdle 22 engages and supports lower hub assembly 14, allowing lower hub assembly 14 to rotate freely with respect to girdle 22. The support provided by girdle 22 carries strain applied to upper hub assembly 12 and lower hub assembly 14. Without such support, the strain can cause jackshaft 42 and driveshaft 44 to flex, resulting in damage to jackshaft 42 and driveshaft 44.

Belt 18 is a drive belt, which is looped around and engages upper hub assembly 12, lower hub assembly 14, and tensioning roller 16. Tensioning roller 16 is mounted to cross plate 24 at slot 34 with mounting screws 46. When mounting screws 46 are fully inserted they pinch tensioning roller 16 into place. When mounting screws 46 are not fully inserted, tensioning roller 16 is able to slide axially along slot 34 to increase or reduce tension in belt 18. Sliding tensioning roller 16 towards the outer edge of slot 34 increases tension in belt 18. When a desired tension is obtained, mounting screws 46 are fully inserted to securely pinch tensioning roller 16 to cross plate 24 and prevent axial movement along slot 34.

In an alternative embodiment of the present invention, belt 18 can be looped around the inner side of tensioning roller 16, towards the middle of flex plate 10, so that tensioning roller contacts the non-splined surface of belt 18. Tension in belt 18 is then increased by sliding tensioning roller 16 towards the inner edge of slot 34 (towards the middle of flex plate 10).

FIG. 2 illustrates the installation of the present invention to engine chain case 20. Upper hub assembly 12 is inserted onto jackshaft 42 and lower hub assembly 14 is inserted onto driveshaft 44. Tensioning roller 16 is placed adjacent to cross plate 24 at slot 34. Belt 18 is looped around and engages upper hub assembly 12, lower hub assembly 14, and tensioning roller 16. Flex plate 10 and standoffs 36 are then positioned so that they are attachable to engine chain case 20. Bolts 38 are inserted into holes 32, through standoffs 36, and into the engine chain case to securely support flex plate 10. Tensioning roller 16 is then adjusted so that belt 18 is under proper tension. Finally, mounting screws 46 are fully inserted through slot 34 and into tensioning roller 16 to securely pinch and prevent tensioning roller 16 from moving axially along slot 34 to prevent belt 18 from losing tension.

Once installed, the present invention provides an efficient and durable drive system. Flex plate 10 carries the strain applied to upper hub assembly 12 and lower hub assembly 14 caused by tension in belt 18. Flex plate 10 contains ribs 30, which reinforce flex plate 10 at critical points to carry any strain applied to upper hub assembly 12 and lower hub assembly 14, and distributes the stress loads through flex plate 10. This prevents jackshaft 42 and driveshaft 44 from flexing, and correspondingly eliminates damage and performance reduction resulting from the flexing.

Figure 3:
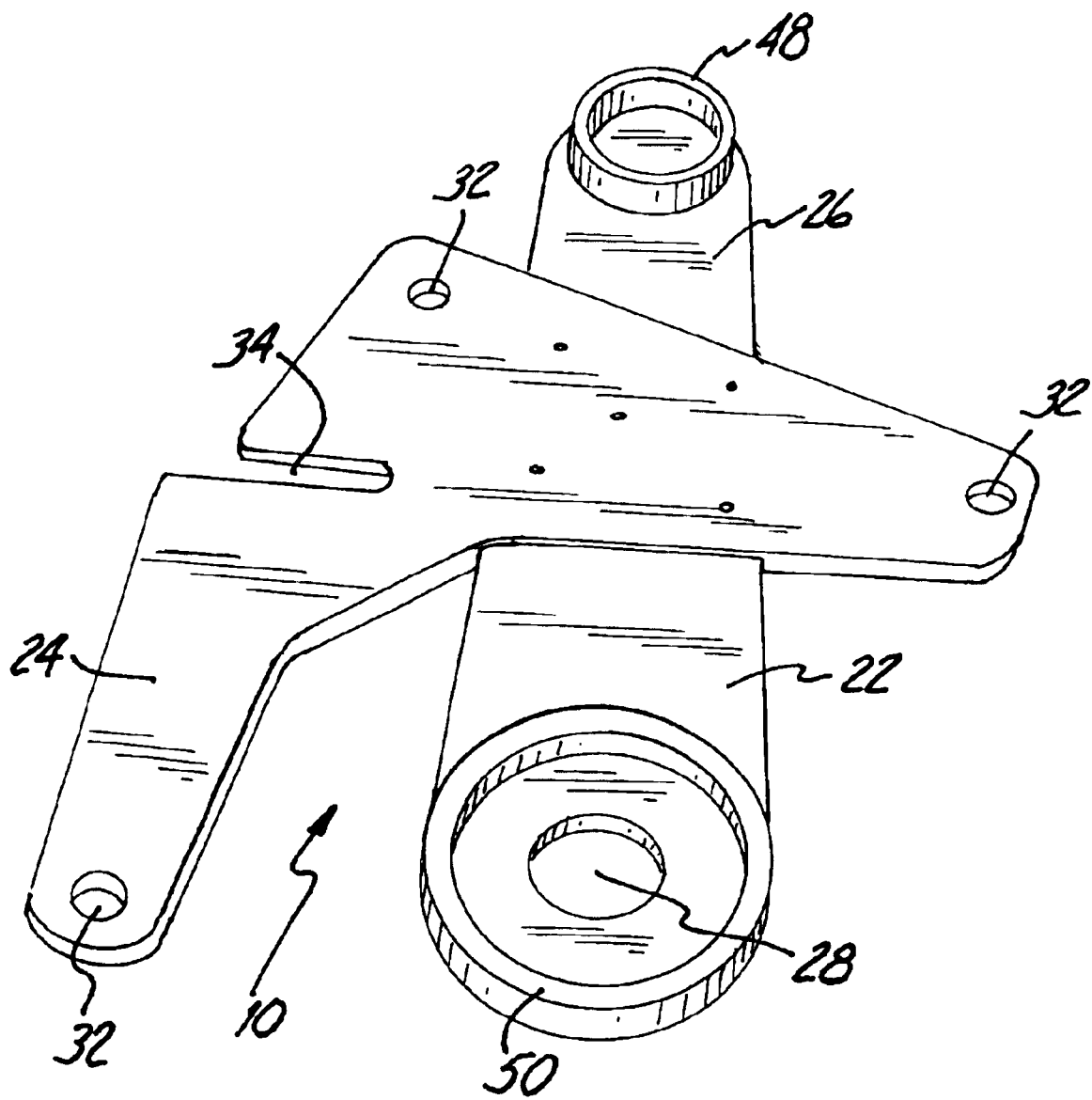
FIG. 3 is a rear view of the flex plate of the present invention.

FIG. 3 is a rear view of flex plate 10 and includes girdle 22 and cross plate 24. Girdle 22 includes first end 26, second end 28, upper brace 48, and lower brace 50. Cross plate 24 includes holes 32 and slot 34. Holes 32 allow flex plate 10 to be securely mounted to engine chain case 20 (shown in FIG. 1). Slot 34 allows tensioning roller 16 (shown in FIG. 1) to be mounted to flex plate 10. Upper brace 48 is the portion of first end 26 that engages and supports upper hub assembly 12 (shown in FIG. 1), allowing upper hub assembly 12 to rotate freely with respect to flex plate 10. Lower brace 50 is the portion of second end 28 that engages and supports lower hub assembly 14 (shown in FIG. 1), allowing lower hub assembly 14 to rotate freely with respect to flex plate 10. By providing such support, flex plate 10 carries the strain applied to upper hub assembly 12 and lower hub assembly 14.

Figure 4:
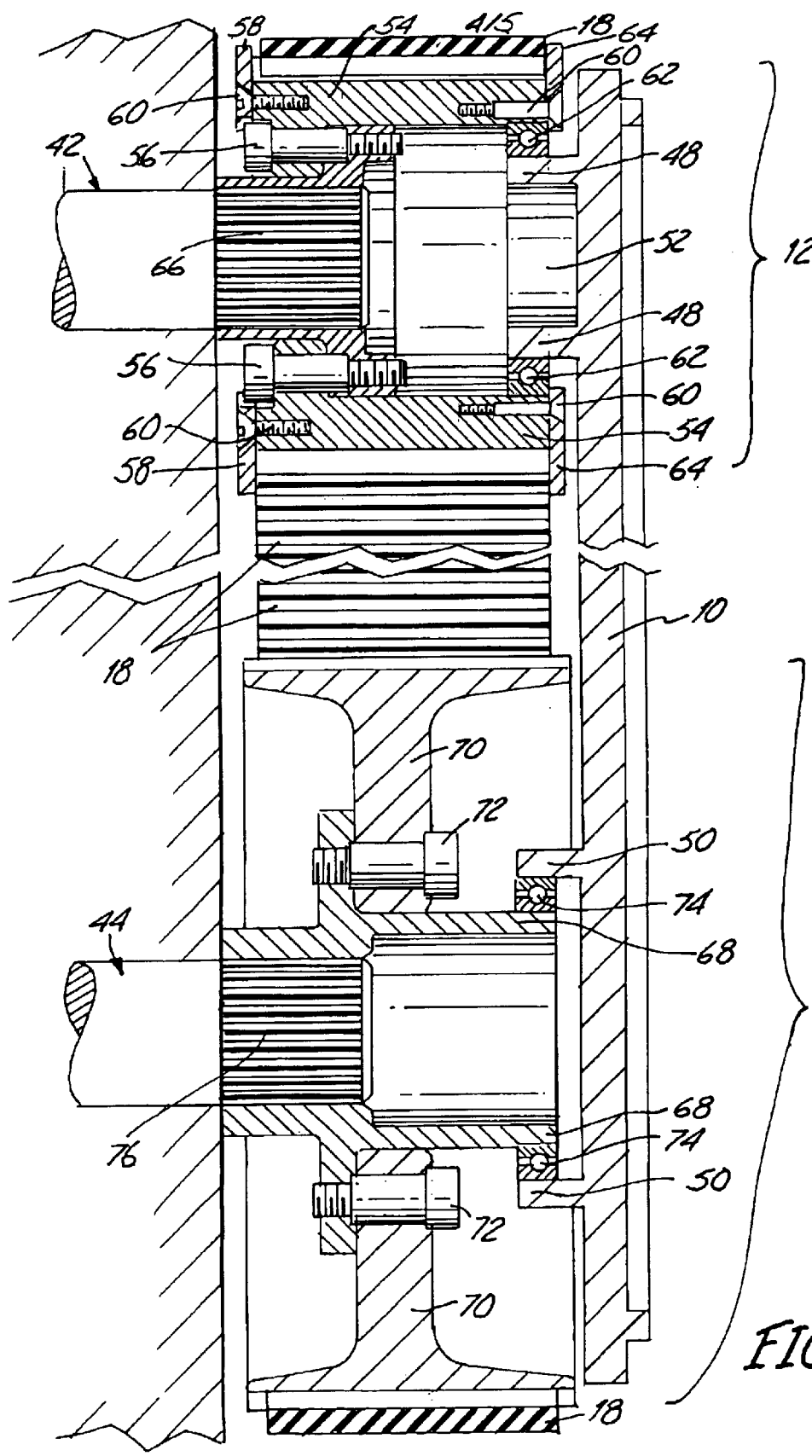
FIG. 4 is a cross-sectional view of the present invention.

FIG. 4 is a cross-sectional view of the present invention as viewed from cut line A in FIG. 1 and includes flex plate 10, upper hub assembly 12, lower hub assembly 14, belt 18, jackshaft 42, and driveshaft 44. Flex plate 10 includes upper brace 48 and lower brace 50. Upper hub assembly 12 includes upper carrier hub 52, upper belt pulley 54, bolts 56, rear flange 58, flange bolts 60, bearings 62, front flange 64, and hub splines 66. Lower hub assembly 14 includes lower carrier hub 68, lower belt pulley 70, bolts 72, bearings 74, and hub splines 76.

Upper carrier hub 52 is attached inside upper belt pulley 54 by bolts 56, with the use of counter bores to lessen twisting loads placed on bolts 56. Rear flange 58 is attached to upper belt pulley 54 by flange bolts 60. Bearings 62 insert onto upper carrier hub 52 for reducing strain applied to upper hub assembly 12 and jackshaft 42. Bearings 62 are secured against upper carrier hub 52 by front flange 64, which is attached to upper belt pulley 54 by flange bolts 60. Upper carrier hub 52 inserts onto jackshaft 42 with hub splines 66 matching up with splines on jackshaft 42. As shown in FIG. 4, upper brace 48 inserts between upper carrier hub 52 and bearings 62 allowing upper hub assembly 12 to rotate freely with respect to flex plate 10, while also providing support to carry stresses applied to upper hub assembly 12 and jackshaft 42 by tension in belt 18.

Lower carrier hub 68 is attached inside lower belt pulley 70 by bolts 72, with the use of counter bores to lessen the twisting loads that are placed on bolts 72. Bearings 74 are attached to lower carrier hub 68 and reduce strain applied to driveshaft 44. Lower carrier hub 68 inserts onto driveshaft 44 with hub splines 76 matching up with splines on driveshaft 44. As shown in FIG. 4, lower brace 50 inserts around bearings 74 allowing lower hub assembly 14 to rotate freely with respect to flex plate 10, while also providing support to carry stresses applied to lower hub assembly 14 and driveshaft 44 by tension in belt 18.

The present invention is not intended to be limited to upper brace 48 and lower brace 50 being inserted exactly as stated above. Upper brace 48 can engage upper hub assembly 12 in other similar manners that provide support for upper hub assembly 12 and allow upper hub assembly 12 to rotate freely with respect to flex plate 10. Similarly, lower brace 50 can engage lower hub assembly 14 in other similar manners that provide support for lower hub assembly 14 and allow lower hub assembly 14 to rotate freely with respect to flex plate 10.

Belt 18 loops around and engages upper belt pulley 54 and lower belt pulley 70 (and also tensioning roller 16 shown in FIGS. 1 and 2). Front flange 64 and rear flange 58 of upper hub assembly 12 prevent belt 18 from slipping off upper hub assembly 12, lower hub assembly 14, and tensioning roller 16. Because belt 18 is under tension, upper hub assembly 12 and lower hub assembly 14 are strained. Correspondingly, jackshaft 42 and driveshaft 44 are strained to flex together. This can damage jackshaft 42 and driveshaft 44, resulting in performance loss of the drive system. However, upper brace 48 supports upper hub assembly 12 and lower brace 50 supports lower hub assembly 14. The stress loads are distributed through flex plate 10 instead of being carried by jackshaft 42 and driveshaft 44. This prevents jackshaft 42 and driveshaft 44 from flexing, and correspondingly eliminates performance reduction in the drive system resulting from the flexing.

Figure 5:
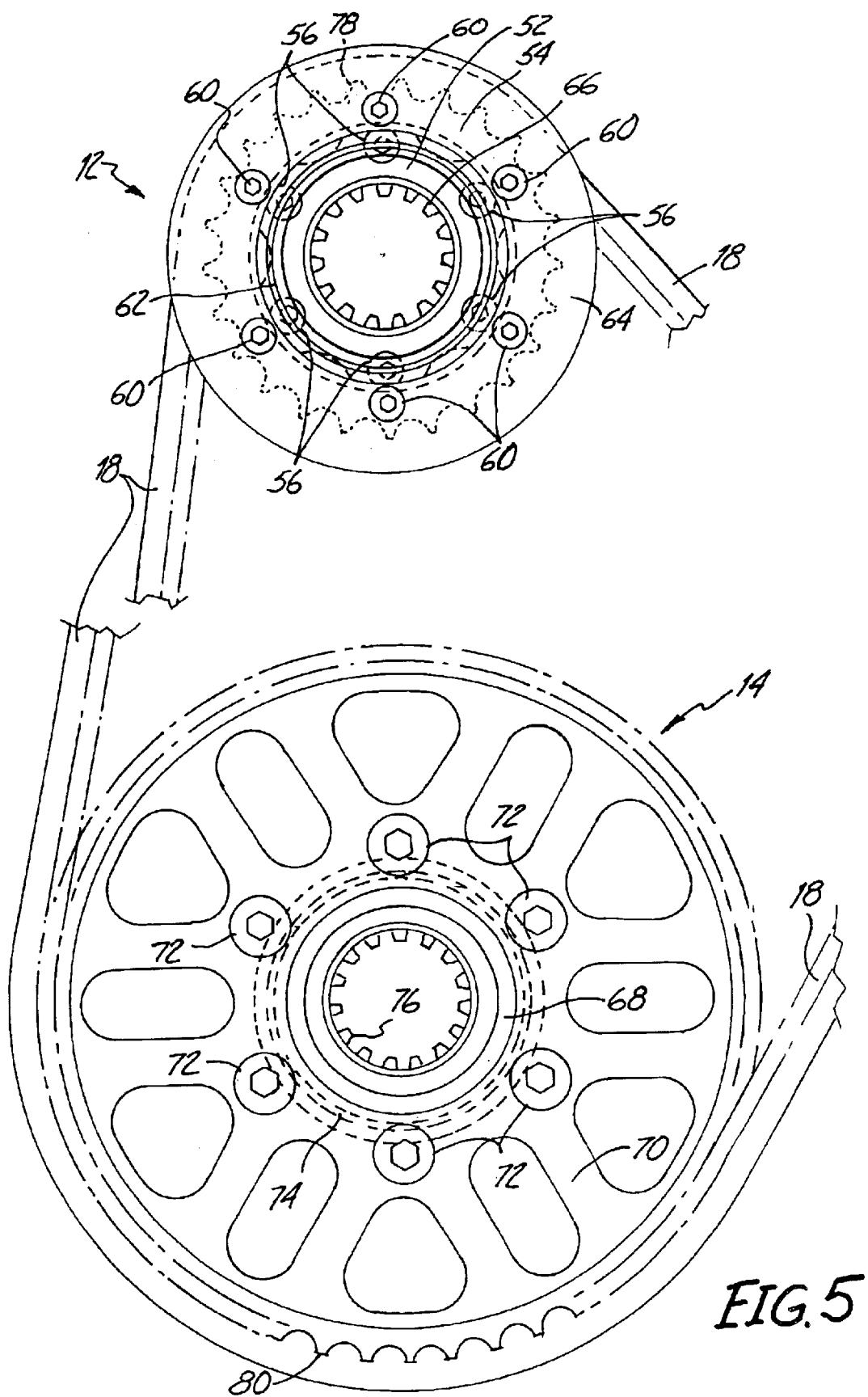
FIG. 5 is front view of the present invention corresponding to FIG. 4.

FIG. 5 is a front view of the present invention corresponding to FIG. 4. FIG. 5 includes upper hub assembly 12, lower hub assembly 14, and belt 18. Upper hub assembly 12 includes upper carrier hub 52, upper belt pulley 54, bolts 56, flange bolts 60, bearings 62, front flange 64, and hub splines 66. Upper belt pulley 54 includes pulley splines 78. Lower hub assembly 14 includes lower carrier hub 68, lower belt pulley 70, bolts 72, bearings 74, and hub splines 76. Lower belt pulley 70 includes pulley splines 80.

Upper carrier hub 52 is attached inside upper belt pulley 54 by bolts 56, with the use of counter bores to lessen twisting loads placed on bolts 56. Bearings 62 insert onto upper carrier hub 52 and are secured against upper carrier hub 52 by front flange 64. Front flange 64 is attached to upper belt pulley 54 by flange bolts 60. Pulley splines 78 are attached radially around upper belt pulley 54. Upper carrier hub 52 inserts onto jackshaft 42 (as shown in FIGS. 1 and 2) with hub splines 66 matching up with splines on jackshaft 42.

Lower carrier hub 68 is attached inside lower belt pulley 70 by bolts 72, with the use of counter bores to lessen twisting loads placed on bolts 72. Bearings 74 are attached to lower carrier hub 68. Pulley splines 80 are attached radially around lower belt pulley 70. Lower carrier hub 68 inserts onto driveshaft 44 (as shown in FIGS. 1 and 2) with hub splines 76 matching up with splines on driveshaft 44.

Belt 18 loops around and engages upper belt pulley 54 and lower belt pulley 70 (and tensioning roller 16 shown in FIGS. 1 and 2). Belt 18 has splines that match up with pulley splines 78 on upper belt pulley 54 and with pulley splines 80 on lower belt pulley 70.

FIG. 5 illustrates the strain applied to upper hub assembly 12 and lower hub assembly 14 by belt 18. The tension of belt 18 pulls upper hub assembly 12 and lower hub assembly 14 towards each other, which could result in flexing of jackshaft 42 and driveshaft 44. The present invention, however, prevents such flexing with the use of flex plate 10. When upper brace 48 of flex plate 10 is inserted between upper carrier hub 52 and bearings 62, and lower brace 50 of flex plate 10 is inserted around bearings 74, flex plate 10 supports upper hub assembly 12 and lower hub assembly 14 and carries the strain applied to them. By carrying the strain, flex plate 10 prevents flexing of jackshaft 42 and driveshaft 44.

The present invention, as described above, provides for an efficient and durable drive system that eliminates shaft flexing, is capable of directly replacing a factory drive system, and is easy to install. Although the present invention has been described with reference to preferred embodiments, workers skilled in the art will recognize that changes may be made in form and detail without departing from the spirit and scope of the invention.

What is claimed is:

1. A drive system support comprising a flex plate that is engagable to a first rotatable element and a second rotatable element of a vehicle drive system for carrying strain applied to the first and second rotatable elements by a flexible drive element, wherein the flex plate comprises a girdle and a cross plate.

2. The drive system support of claim 1, wherein the flex plate is directly mountable to an engine chain case.

3. The drive system support of claim 1 wherein the first rotatable element comprises an upper hub assembly and the second rotatable element comprises a lower hub assembly.

4. A drive system for connecting a first shaft and a second shaft, the drive system comprising:
   a first hub assembly for mounting on the first shaft;
   a second hub assembly for mounting on the second shaft;
   a flexible drive element connecting the first and second hub assemblies; and
   a flex plate, wherein the flex plate comprises a first end and a second end, wherein the first end engages the first hub assembly, wherein the second end engages the second hub assembly, and wherein the flex plate carries strain applied to the first hub assembly and the second hub assembly.

5. The drive system of claim 4, wherein the flexible drive element comprises a drive belt that engages the first hub assembly and the second hub assembly.

6. The drive system of claim 4, wherein the flex plate is directly mountable to an engine chain case.

7. The drive system of claim 4, wherein the flex plate comprises a girdle and a cross plate.

8. The drive system of claim 4, wherein the first hub assembly comprises bearings.

9. The drive system of claim 4, wherein the second hub assembly comprises bearings.

10. The drive system of claim 4, and further comprising:
    a tensioning roller supported by the flex plate and engaging the flexible drive element.

11. A belt drive system comprising:
    a first hub assembly;
    a second hub assembly;
    a tensioning roller;
    a drive belt that engages the first and second hub assemblies and the tensioning roller; and
    a flex plate that engages the first hub assembly, the second hub assembly, and the tensioning roller, wherein the flex plate carries strain applied to the first hub assembly and the second hub assembly.

12. The belt drive system of claim 11, wherein the flex plate is directly mountable to an engine chain case.

13. The belt drive system of claim 11, wherein the flex plate comprises a girdle and a cross plate.

14. A belt drive system of claim 11, wherein the first hub assembly comprises bearings.

15. A belt drive system of claim 11, wherein the second hub assembly comprises bearings.

16. A belt drive system comprising:
    a first hub assembly engagable with a vehicle jackshaft for transferring power from the vehicle jackshaft to the first hub assembly;

a second hub assembly engagable with a vehicle driveshaft for transferring power from the second hub assembly to the driveshaft;

a belt engaging the first hub assembly and the second hub assembly for transferring power from the first hub assembly to the second hub assembly; and a flex plate engaging the first hub assembly and the second hub assembly, wherein the flex plate reduces flexing of the vehicle jackshaft and the vehicle driveshaft.

17. A belt drive system comprising:

a flex plate comprising a girdle and a cross plate, wherein the girdle comprises a first end, a second end, and a middle section located between the first end and the second end of the girdle, wherein the cross plate comprises a first end, a second end, and a middle section located between the first end and the second end of the cross plate and wherein the middle section of the girdle is attached to the middle section of the cross plate;

a first hub assembly engaging with the first end of the girdle, and wherein the first hub assembly is engagable with a vehicle jackshaft;

a second hub assembly engaging with the second end of the girdle, and wherein the second hub assembly is engagable with a vehicle driveshaft;

a tensioning roller interacting with the first end of the cross plate; and a belt which engages the first hub assembly, the second hub assembly, and the tensioning roller.

* * * * *